UNITED STATES PATENT OFFICE.

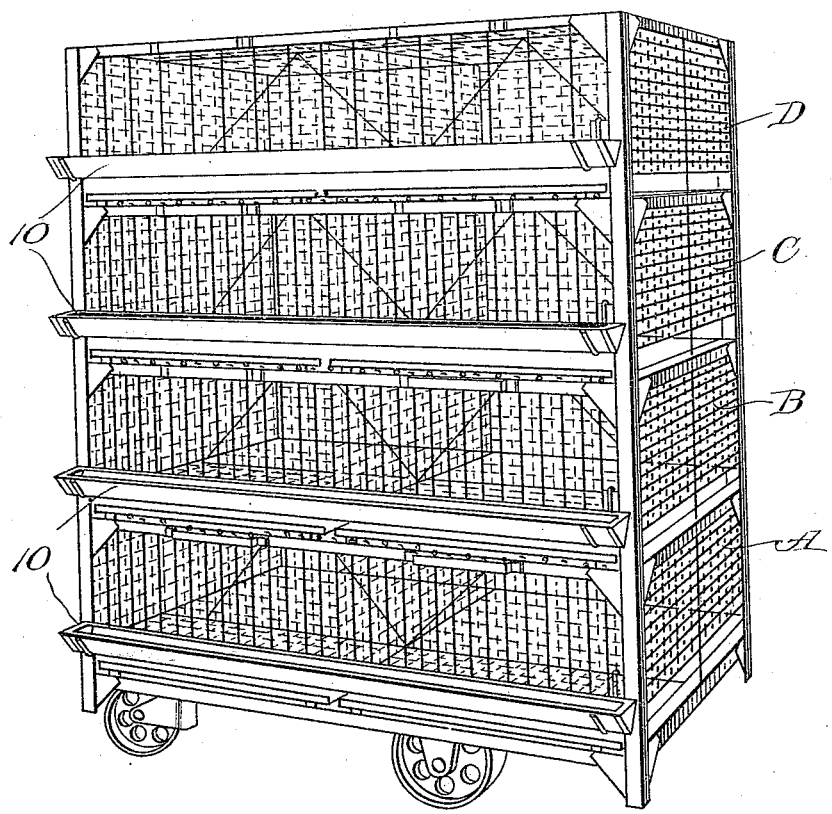

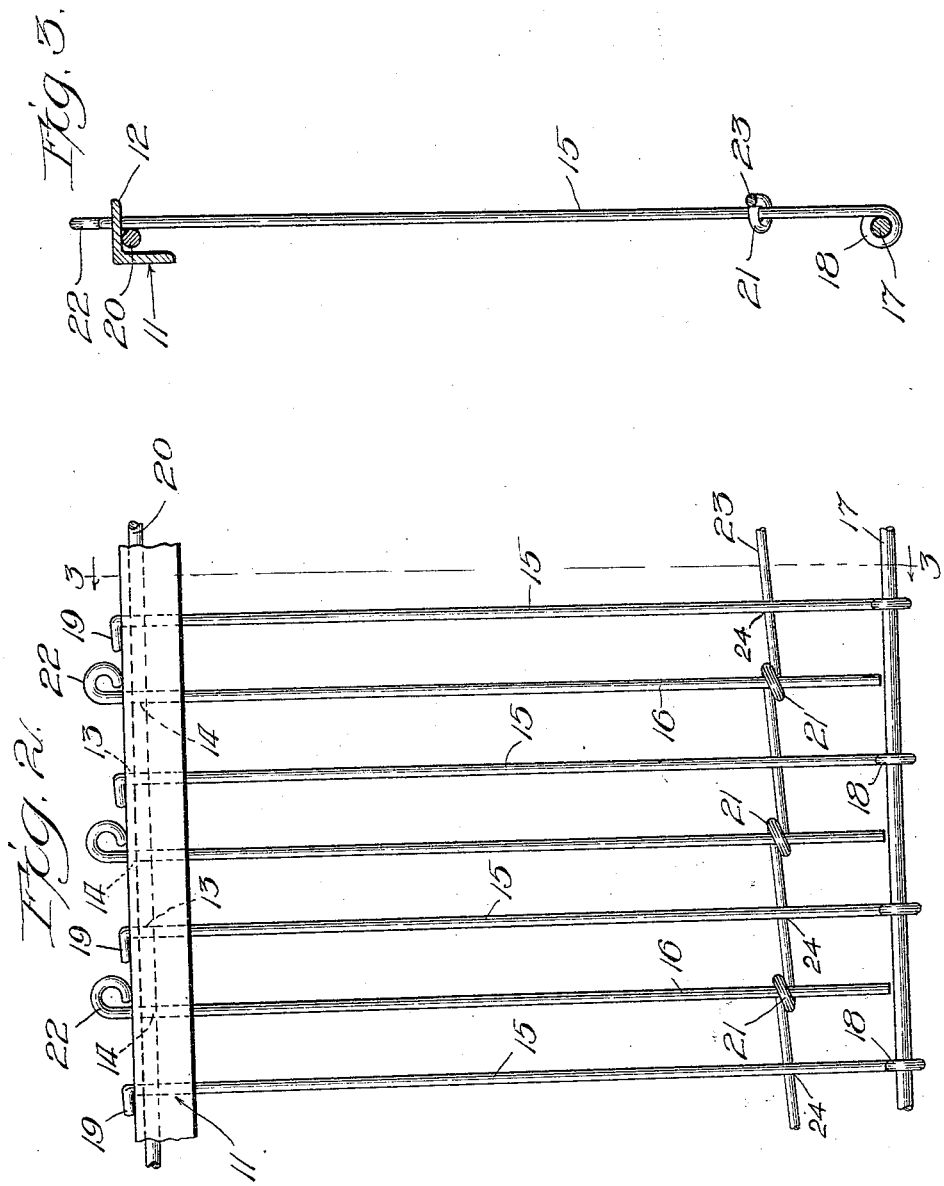

HAROLD G. COLLIS, OF CLINTON, IOWA, ASSIGNOR TO THE COLLIS COMPANY, OF CLINTON, IOWA, A CORPORATION OF IOWA.

POULTRY COOP.

1,413,458.  Specification of Letters Patent.  Patented Apr. 18, 1922.

Application filed June 5, 1920. Serial No. 386,677.

*To all whom it may concern:*

Be it known that I, HAROLD G. COLLIS, a citizen of the United States, residing at Clinton, in the county of Clinton and State of Iowa, have invented certain new and useful Improvements in Poultry Coops, of which the following is a specification.

This invention relates to a poultry coop formed in part of wires which are spaced apart a desired distance to provide an enclosure of the kind required. More particularly it is concerned with certain improvements by which the spacing of the wires may be varied in accordance with the requirements of diverse conditions. As represented in the drawings and specification to follow, the invention may be adapted to poultry feeding batteries comprising a plurality of superposed units.

Having thus stated the general objects of this invention, I will now proceed to a detailed explanation thereof, wherein other objects and purposes as well will be disclosed from the accompanying specification and drawings, in which—

Figure 1 is a view in perspective of a poultry feeding battery embodying the features of this invention;

Fig. 2 is a fragmentary detail exhibiting on an enlarged scale the wire construction that is novel to this invention; and Fig. 3 is a transverse section taken on line 3—3 of Fig. 2.

Poultry feeding coops of the kind to which this invention may be adapted are frequently combined into battery formation by superposing various coop units, such as are designated as A, B, C, and D, in the manner shown in Fig. 1. Each coop unit may be suitably provided with doors through which the poultry are introduced for confinement, and with a feeding trough 10 arranged usually adjacent the front side so as to be accessible to the poultry within the coop. The coops to which the present improvements are adaptable are formed in large part of wire bars secured to cross tie wires by which construction there are provided intervening spaces of a predetermined width through which the poultry are enabled to reach the food within the feeding troughs. It frequently happens that poultry of varying sizes require accommodation, in which event the spaces between the bars or wires should vary accordingly, as otherwise the smaller poultry would not be held in confinement unless these spaces were properly reduced. It is, therefore, largely with a construction that provides for varying the width of these spaces for the purpose mentioned that this invention is concerned.

Referring now to Figs. 2 and 3, wherein is shown a fragmentary view of one of the vertical walls of the coop, the numeral 11 designates a horizontal angle iron which is desirably a part of the coop framework. Through the horizontal flange 12 of this angle are formed a plurality of holes 13 and 14 arranged in alternation, the former receiving one end of a series of fixed wires 15 and the latter a series of loose wires 16. Each of the fixed wires at its opposite end is fastened to a cross tie wire 17 preferably by being curled therearound as at 18. The end of each fixed wire adjacent the angle may be bent as at 19 to overlie the flange 12, and is further secured as by welding to a second cross tie wire 20 which may underlie the flange 12, the effect being to hold each fixed wire rigidly against vertical movements.

Arranged relatively remote from the angle is another cross tie wire 23 preferably connected as by welding at 24 to each fixed wire 15 formed to provide a plurality of loops 21, one intermediate each pair of fixed wires and in substantial alignment with the holes 14, these several loops 21 being adapted to receive the proximate ends of the loose wires 15 whose opposite ends are retained within the angle. Preferably one end of each loose wire is curled in the form of an eye 22 to overlie the angle flange 12 and to afford a convenient handle for its manipulation. I have thus provided a means for detachably holding a plurality of loose wires whose use is especially desirable when it is necessary to reduce or partially close up the spaces intervening between the fixed wires.

It will be apparent that the present improvements may be embodied in forms other than the precise one herein shown and described, and accordingly it is desired that changes or modifications in the exhibited construction be included within the scope of this invention as defined in the claims following.

I claim:

1. In a coop, the combination with a suitable framework, of an angle iron one of whose flanges is provided with a plurality of spaced openings therein, a plurality of fixed wires entered alternately through the openings in the angle iron, means for securing the fixed wires against removal therefrom, a cross tie wire in spaced relation to the angle iron and connected with each fixed wire whereby said cross tie wire affords support therefor at points which are remote from the angle iron, and a further tie wire in parallelism with the cross tie wire having a plurality of loops one lying within each space intermediately of the several fixed wires, the loops being disposed with their axes parallel with the fixed wires, and a plurality of loose wires arranged in alternation with the fixed wires, having one end of each supported within one of the loops, and the other within an opening in the angle iron, substantially as described.

2. In a coop, the combination with a suitable framework, of an angle iron one of whose flanges is provided with a plurality of spaced openings therein, a plurality of fixed wires entered alternately through the openings in the angle iron and having their proximate ends bent laterally in overlying relation thereto, a cross tie wire in adjacent relation to the said flange of the angle iron but on the side thereof which is opposite to the bent ends of the fixed wires, a connection between each fixed wire and the cross tie wire, and a second cross tie wire in spaced relation to the first and connected with another portion of each fixed wire whereby said cross tie wires afford support for each fixed wire at removed points, and a third tie wire in parallelism with the other cross tie wires, the third cross tie wire being provided with a plurality of loops one lying within each space intermediately of the several fixed wires, the loops being disposed with their axes parallel with the fixed wires, and a plurality of loose wires arranged in alternation with the fixed wires, having one end of each supported within one of the loops, and the other within an opening in the angle iron, substantially is described.

HAROLD G. COLLIS.